Patented Mar. 10, 1925.

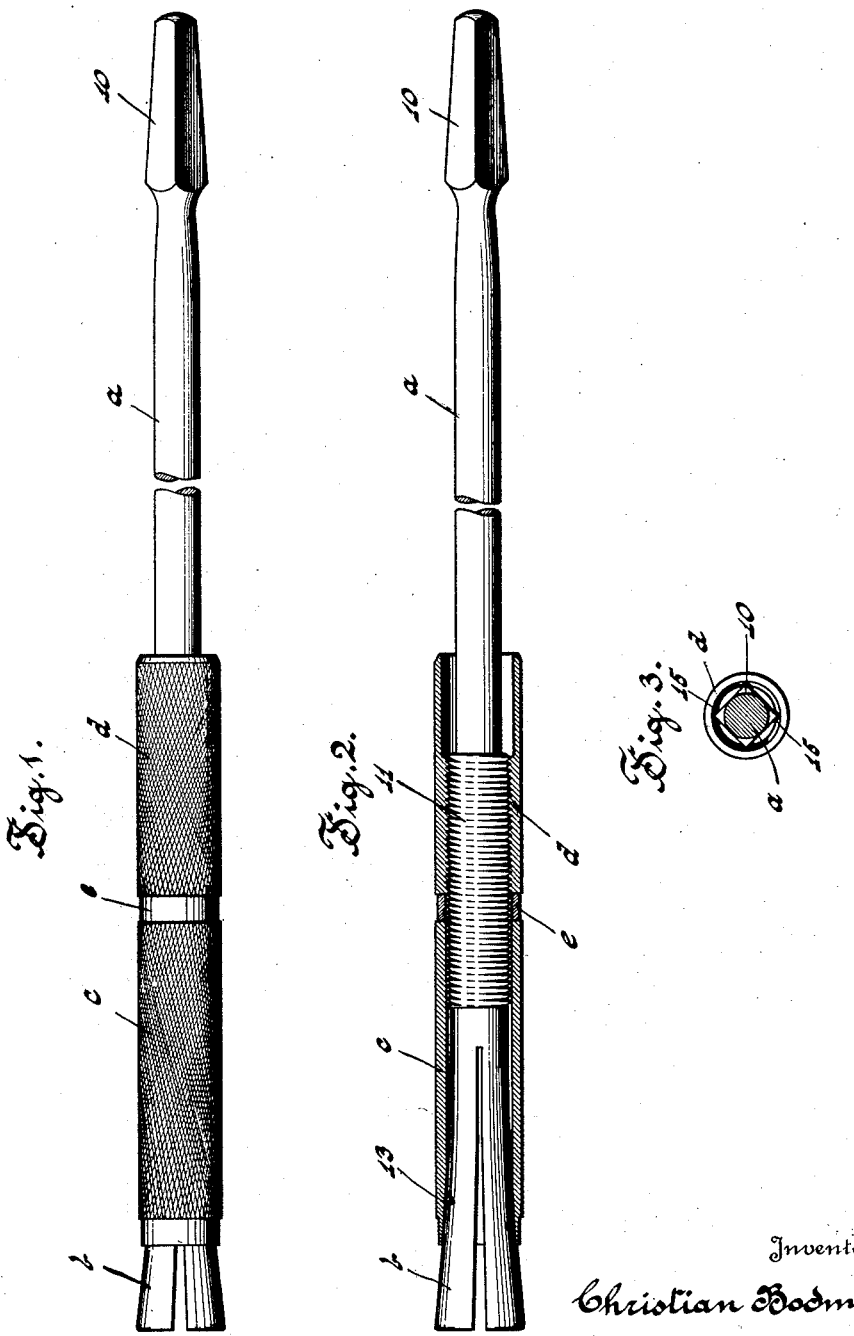

1,529,006

UNITED STATES PATENT OFFICE.

CHRISTIAN BODMER, OF NEW BRITAIN, CONNECTICUT, ASSIGNOR TO THE STANLEY WORKS, OF NEW BRITAIN, CONNECTICUT, A CORPORATION OF CONNECTICUT.

BIT-BRACE EXTENSION.

Application filed April 9, 1924. Serial No. 705,166.

*To all whom it may concern:*

Be it known that I, CHRISTIAN BODMER, a citizen of the United States, and a resident of New Britain, county of Hartford, State of Connecticut, have invented certain new and useful Improvements in Bit-Brace Extensions, of which the following is a specification.

This invention relates to a holder or extension adapted to be used in connection with a bit brace, and by means of which the bit is extended to enable the user to bore holes through structures where the ordinary bit, without the use of an extension, will not reach.

The aim of the invention is to provide an extension or holder of this sort having various features of novelty and advantage and which is particularly characterized by its extreme strength and durability, the simplicity in construction, its effectiveness in operation, and the readiness with which the parts may be assembled or replaced when necessary.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indcated in the appended claim.

In the accompanying drawing, wherein I have shown, for illustrative purposes, one embodiment which the present invention may take:

Figure 1 is a side elevation of my improved extension;

Fig. 2 is a view similar to Fig. 1 with parts in longitudinal section; and

Fig. 3 is a view looking at the forward end of the nut or thimble.

Referring to the drawing in detail, my improved holder comprises an extension portion proper having a shank $a$ of suitable length, and a socket or collet $b$ at one end of the shank. Preferably, the socket and shank are integral, being formed from a single piece of steel so that it has great strength and durability and the socket cannot work loose from the shank during the boring operation. The end of the shank opposite the socket is squared and tapered, as at 10, so as to be received and clamped by the usual jaws or chuck with which the ordinary bit brace is provided. The socket or collet is of generally tapering construction and is longitudinally slotted so as to provide a plurality of spring fingers, as shown most clearly in Fig. 2. The shank $a$, adjacent the inner end of the socket $b$, is of somewhat larger diameter than the remaining portion of the shank and is provided with a thread 11. Preferably, the root diameter of the thread is slightly less than, and the outside diameter is substantially the same as, the greatest diameter of the squared end 10. If desired, the extension proper, which is provided with the socket, shank, and an intermediate threaded portion, may be formed of more than two pieces of steel which are welded together so as to give the requisite strength and to insure that there will be no turning movement or looseness between these parts during the boring operation. The letter $c$ designates a sleeve having a sliding fit at its rear end on the threaded portion 11 and having its forward end internally tapered as at 13 to correspond to and closely fit the tapered collet $b$. $d$ indicates a nut having at one end an internal thread adapted to engage with the threads 11 on the shank. The nut, at its rear end, has a smooth bore and constitutes a skirt for concealing the threaded portion $b$ when the nut is in advanced position.

As seen from Fig. 3, the threaded portion of the nut is provided with longitudinally extending grooves 15 spaced apart corresponding to the edges of the squared end 10 of the shank so as to permit the nut to be slipped over the end of the shank when it is desired to assemble the nut in position or take it off. Between the nut $d$ and the sleeve $c$ is a ring $e$ which serves to reduce the friction and which gives a pleasing appearance.

From the foregoing description, it will be seen that my improved extension comprises a relatively few number of parts, each of which, while being very simple in construction, is very strong and durable. These parts may be economically manufactured. The rod, comprising the shank, the socket and the intermediate threaded portion, being integral from end to end, is enabled to stand great strains without breaking. The threaded portion of the shank is of sufficient diameter to permit a thread of such size thereon that the stripping of the threads will not take place, and the squared end 10 of the shank is of such size as to be securely held by the ordinary jaws or chuck of a bit brace. The sleeve c and the nut are readily replaceable. It will be seen that, if it is desired to replace either of these parts, it is only necessary to unscrew the nut from the threaded portion and then slip the parts over the squared end 10.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

A bit brace extension including a shank, a socket, and an intermediate threaded portion integral with one another, the rear end of said shank having a squared tapered portion adapted to be received by the chuck of a bit brace, a sleeve having its forward end surrounding said socket and its rear end slidably fitting said threaded portion, the bore of said sleeve being of greater diameter than the maximum diameter of the squared end of said shank so as to be capable of being slipped thereover, the threaded portion of the shank comprising an enlargement the diameter of which equals the diagonal of the squared end, and a nut screwed onto said threaded portion and adapted to advance said sleeve in a direction to contract the jaws, said nut having a skirt at its rear end and having on its threaded portion longitudinally extending grooves of the depth of the thread adapted to receive the corners of the squared end of said shank whereby the nut may be slipped over said end.

CHRISTIAN BODMER.